United States Patent
Hammon et al.

[19]

[11] Patent Number: 5,932,833
[45] Date of Patent: Aug. 3, 1999

[54] FLY OVER HOMING GUIDANCE FOR FIRE AND FORGET MISSILE SYSTEMS

[75] Inventors: Ricky K. Hammon, Decatur; Monte K. Helton, Madison, both of Ala.

[73] Assignee: The United States of America as represented by the Secretary of the Army, Washington, D.C.

[21] Appl. No.: 08/806,750

[22] Filed: Mar. 3, 1997

[51] Int. Cl.⁶ .............................. F42C 13/02; F41G 7/20
[52] U.S. Cl. ..................... 102/213; 244/3.16; 102/475
[58] Field of Search ................... 102/211, 213, 102/214, 475; 244/3.15, 3.16, 3.17

[56] References Cited

U.S. PATENT DOCUMENTS

| | | | |
|---|---|---|---|
| H455 | 4/1988 | Helton | 244/3.15 |
| 3,935,818 | 2/1976 | Johnson et al. | 244/3.16 |
| 3,978,797 | 9/1976 | Harrington et al. | 102/211 |
| 4,160,415 | 7/1979 | Cole | 102/214 |
| 4,198,015 | 4/1980 | Yates et al. | 244/3.15 |
| 4,242,962 | 1/1981 | Wakeman et al. | 102/213 |
| 4,245,559 | 1/1981 | Wakeman et al. | 102/213 |
| 4,245,560 | 1/1981 | Rambauske | 102/213 |
| 4,277,038 | 7/1981 | Yates et al. | 244/3.15 |
| 4,383,662 | 5/1983 | Alongi et al. | 244/3.15 |
| 4,409,900 | 10/1983 | Currie | 102/213 |
| 4,444,110 | 4/1984 | Lindner et al. | 102/213 |
| 4,494,437 | 1/1985 | Von Maydell | 89/1.51 |
| 4,532,867 | 8/1985 | Mitchell | 102/213 |
| 4,556,313 | 12/1985 | Miller, Jr. et al. | 356/1 |
| 4,611,771 | 9/1986 | Gibbons et al. | 244/3.12 |
| 4,614,317 | 9/1986 | Stavis | 244/3.19 |
| 4,848,236 | 7/1989 | Hembise | 102/427 |
| 4,898,341 | 2/1990 | Terzian | 244/3.16 |
| 5,261,629 | 11/1993 | Becker et al. | 244/3.22 |

*Primary Examiner*—Charles T. Jordan
*Assistant Examiner*—Christopher K. Montgomery
*Attorney, Agent, or Firm*—Howard G. Garner; Freddie M. Bush

[57] ABSTRACT

The fly over homing guidance system for terminal homing missile guidance is a fire and forget missile guidance method wherein on board target sensing tracks the target and guides the missile to the target, but instead of being guided to a direct impact as is conventionally done, the missile is guided toward a precise distance over the top of the target, intentionally avoiding impact. A second sensor on the missile detects the leading edge of the target, such as the turret of a tank. The warhead is then fired down onto the top of the target as the missile is guided or directed over it. Further, the shot line of the warhead is substantially perpendicular to the top of the target, maximizing lethality. This allows the use of the same angle of attack and warhead for all modes of target engagement and thus maintains high lethality for every firing scenario.

2 Claims, 6 Drawing Sheets

FLY OVER HOMING GUIDANCE FOR FIRE AND FORGET MISSILE SYSTEMS

DEDICATORY CLAUSE

The invention described herein may be manufactured, used, and licensed by or for the Government for governmental purposes without payment to us of any royalties thereon.

BACKGROUND OF THE INVENTION

Known terminal guidance missile systems have included proportional navigation with trajectory shaping that may result in a flat approach toward a target, a ballistic approach, or a combination of the two. In the flat approach trajectory, such as the direct line of sight mode or command-to-line-of-sight mode, warhead penetration is often reduced due to the shallow shot line for the warhead. In the ballistic or lofted approach to heavy armor targets, the more vulnerable and least armored top of the target is attacked. The ballistic approach attempts to dive on the target at an advantageous, steep, angle of impact, but still fails to achieve the most desired vertical or near vertical impact. Conventional anti-tank terminal homing missile guidance requires a steep impact angle to maximize lethality. This is typically obtained by maneuvering the missile into a top attack trajectory. However, it is difficult to improve performance above existing state-of-the-art, with sensor and autotracker design improvements alone.

Conventional terminal homing fire-and-forget missile systems include an on board target sensing device, such as a passive imaging sensor, which tracks the target and guides the missile to an intercept. The required accuracy of the tracking and guidance is dictated by the warhead lethality versus the intended target's capability to withstand attack. For an anti-tank terminal homing missile system with limited warhead capacity, the required three dimensional accuracy for both aimpoint selection and delivery of the warhead to that aimpoint, continues to become more difficult as tank designs are hardened against such missiles and desired ranges are extended, which compounds the accuracy of a desirable impact angle. The steeper the angle of impact, the more effective is the warhead performance.

SUMMARY OF THE INVENTION

The fly over homing guidance system for terminal homing missile guidance provides a fire and forget missile guidance method wherein an on board target sensing device tracks the target and guides the missile to the target. However, instead of being guided to an impact as is conventionally done, the missile is guided toward a precise distance over the top of the target, intentionally avoiding impact. A second sensor on the missile, such as an optical profilometer, a magnetometer, or a combination of such sensors, is used to detect the leading edge of the target and in the case of a tank target, to detect the turret. For the warhead firing decision and for timing of the firing of the warhead, the missile guidance circuit and/or circuit for estimation of range-to-go to the target are used along with an output signal from the second sensor and any additional sensors. The warhead fusing and firing decision may be based on any one of these inputs or any combination of two or more. The warhead is then fired down onto the top of the target as the missile is guided over it. Further, the shot line of the warhead can be substantially perpendicular to the top of the target, maximizing lethality.

DESCRIPTION OF THE PREFERRED EMBODIMENT

The fly over homing guidance system provides relief for the autopilot and terminal homing autotracker performance. The imaging seeker tracking problem is now reduced from a three dimensional to a two dimensional problem-the third dimension, depth, being separately determined with a second sensor. In addition, the required circular error probability (CEP) for the imaging guidance is much larger than that allowed when guiding to an impact. The fly over system focuses on a two dimensional target which is a relatively large area extending in a plane vertically above the actual target. The steep top attack requirement is eliminated, the autotracker can avoid the difficult climb out phase of the missile trajectory, and the requirement to autonomously adapt to the top of the target after climb out. In fact, the autotracker can actually error and track a small point on the target, such as a wheel, or even a point on the ground in front of or behind the target, and the warhead can still be successfully delivered to the target. This is in contrast to a typical, conventional imaging terminal homing autotracker where the entire target must be successfully segmented from the background in order to select and maintain a lethal aimpoint.

Fly over homing guidance allows the missile to have two modes of operation, both of which can have higher lethality than conventional terminal homing guidance. Thus, in addition to terminal homing guidance, the missile may now have a Command-to-Line-of-Sight (CLOS) mode of operation with the warhead firing down on the target with the same warhead firing logic as the terminal homing guidance mode, minus the missile guidance input. This allows the use of the same angle of attack and warhead for all modes of target engagement and thus maintains high lethality for every firing scenario.

Figure 1:
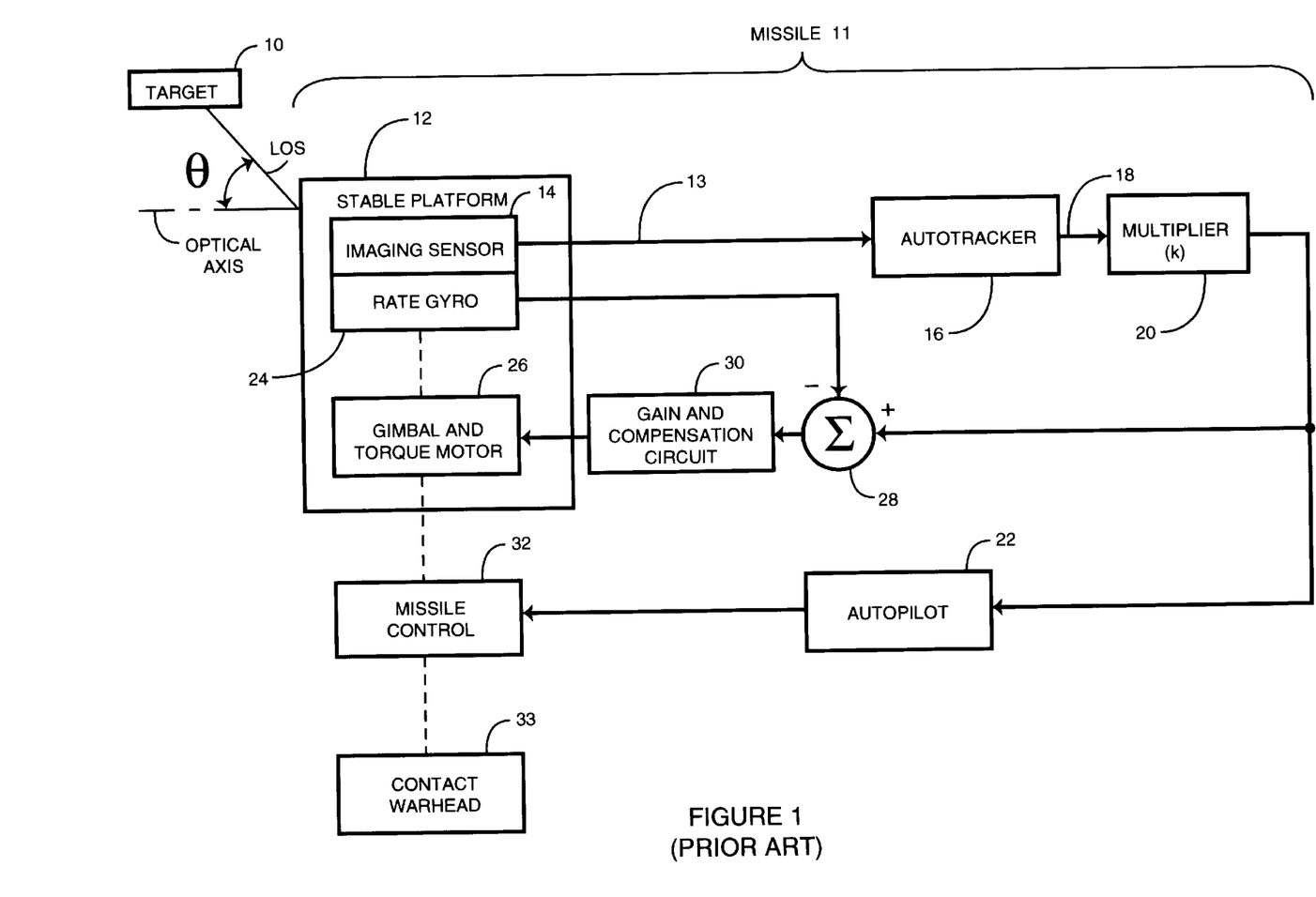
FIG. 1 is a block diagram of a typical prior art terminal guidance tracking system.

Referring now to the drawings wherein like numbers refer to like parts in the several figures, FIG. 1 discloses a typical prior art or conventional system wherein a target 10, such as a tank, is in the optical field of view of an imaging sensor 14 of missile 11. Imaging sensor 14 is mounted on a stable platform 12. The imaging sensor 14 or system target sensor is normally composed of an optical telescope system and a detector and converts an incoming target scene into an electrical signal, which is coupled via output 13 to autotracker 16. The x and y coordinate position of the target within this electrical signal is determined by the angular displacement Θ of the optical axis of sensor 14 with respect to the inertial line of sight (LOS) between the target position and the tracking system reference position or optical axis.

The sensor output 13 is operated upon by the autotracker 16 to extract the target's "x" coordinate. This coordinate is coupled via output 18 to multiplier 20. The tracker output is multiplied by a velocity constant k in multiplier 20 to produce an output rate command that is coupled to the autopilot 22 and coupled back to the stable platform 12 by way of a summing circuit 28. The autopilot generates the appropriate fin commands which are coupled to missile controls 32 to guide the missile to an impact with the target at the selected aimpoint. The impact is typically detected with a contact fuse (not shown) for detonation of the contact warhead 33.

Stable platform 12 includes the rate sensor or rate gyro 24, target imaging sensor 14, and the gimbal and torque motor 26. Other circuitry may be on or attached to the platform but are not pertinent to the operation. Summing circuit 28 receives the output rate command from multiplier 20, and a feedback signal from rate gyro 24, providing an output that is coupled to gain and compensation circuitry 30. The gain and compensation circuitry 30 contains standard state of the art components for providing stable closed loop operation of the rate platform and control loop. The electrical output of circuit 30 is coupled to torque motor 26 and converted to a mechanical torque and a gimbal torque. The mechanical torque is applied to missile controls 32 and the gimbal torque is applied to stable platform 12. A typical stable platform is shown in Statutory Invention Registration No. H455, published Apr. 5, 1988.

The platform 12 responds to the torque applied to it by moving at a rate determined by the magnitude of the applied torque and the inertia of the platform. However, rate sensor 24 is fixed to the stabilized platform and thus responds to the motion of the platform by generating an electrical output proportional to the platform rate, which provides the feedback input to summing circuit 28. As the stable platform 12 moves at a rate in response to an applied undesirable torque (an unwanted input such as a wind gust) an inertial platform angle is developed and, since the target sensor is fixed to the stable platform, the difference between this platform angle and the target line of sight angle is measured by the target sensor 14.

Figure 2:
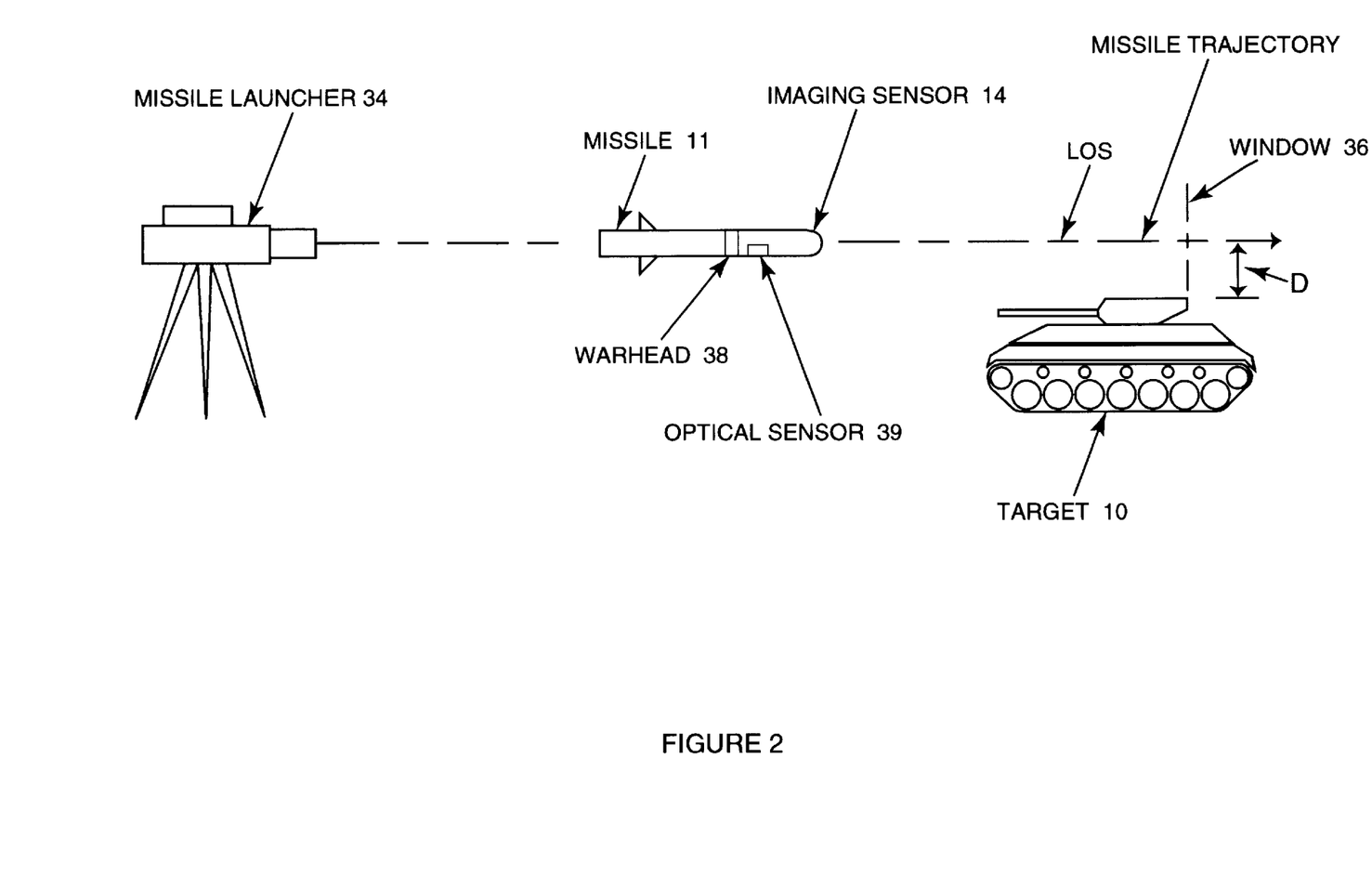
FIG. 2 is a single line diagram of a fire and forget anti-tank missile system which utilizes the fly over homing guidance system.

FIG. 2 depicts a fire and forget anti-tank missile system which utilizes the fly over homing guidance system. A missile 11 is launched from a missile launcher 34 by an operator or gunner (not shown). The gunner uses passive imaging sensor 14 and autotracker 16 (FIG. 3) to lock onto the target. The gunner then fires the missile from the launcher. At this time missile 11 is launched and becomes totally autonomous, needing no more input from the gunner. The autotracker 16 on board the missile, tracks the target in the imaging sensor as the missile closes on the target. At this time the missile trajectory is typical of a terminal homing missile in a direct fire mode. As the missile closes with the target, however, the fly over homing guidance directs the missile to substantially fly a straight line path toward a plane 36 or window over the target that will allow the missile to direct its warhead or warheads substantially vertically downward onto the most vulnerable part of the target, the top. Thus, the missile trajectory is along an LOS or look axis substantially normal to a plane passing through the target as the missile passes over the target. The optical sensor 39 detects the target 10. The warhead firing logic then fires the warhead(s) down onto the top of the target.

Figure 3:
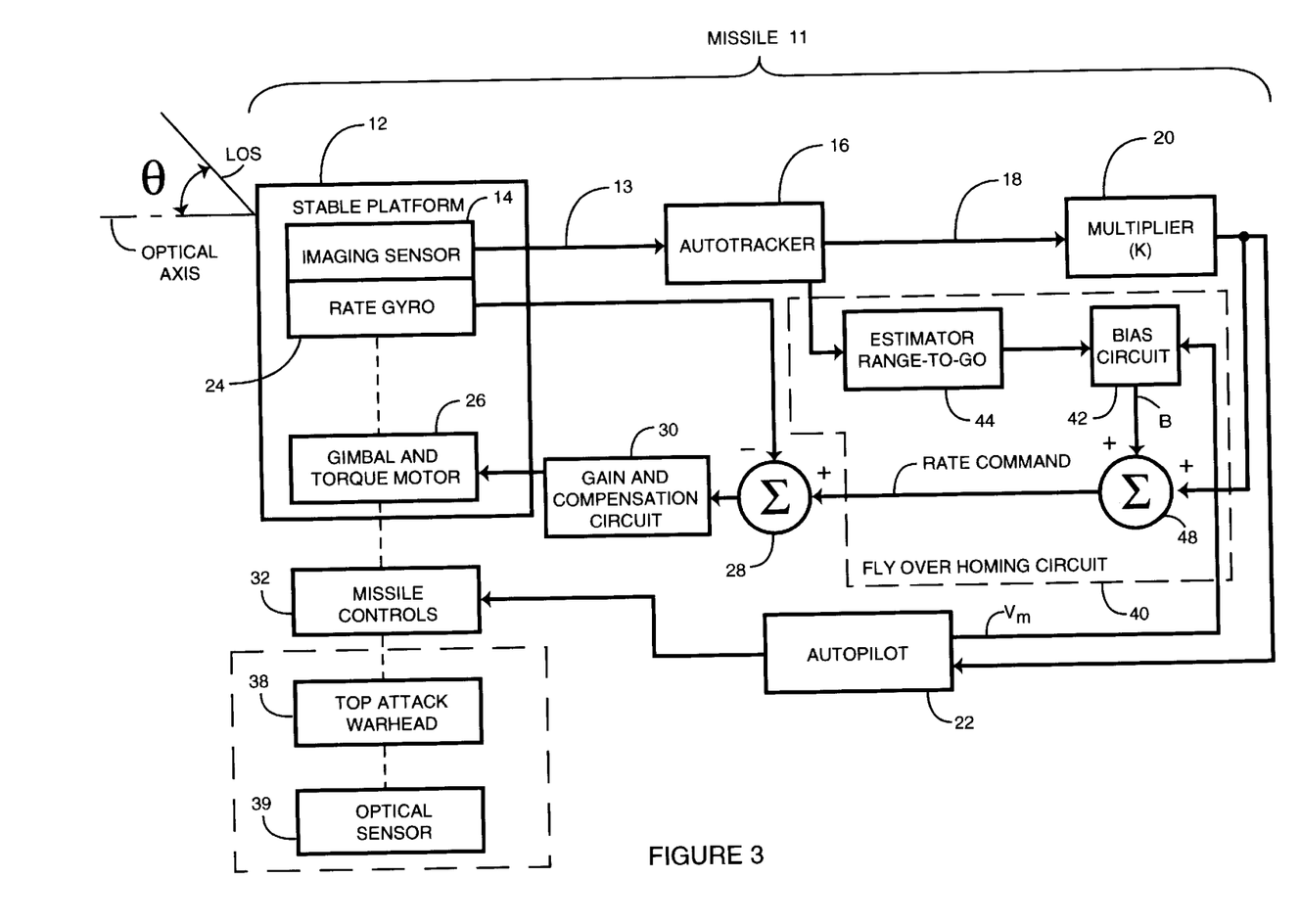
FIG. 3 is a block diagram of a preferred embodiment of the fly over homing circuitry employed in a terminal guidance tracking system.

The circuit components of FIG. 3 are substantially the same in operation as that shown in FIG. 1 except that the flyover homing circuit 40 is added, the warhead circuit is changed, and the target 10 is not shown. In FIG. 3, the flyover homing circuit 40 is shown in dashed lines and is coupled to receive an input signal from autotracker 16, an input from autopilot 22, and an input from the output of multiplier 20. Homing circuit 40 is coupled to provide an output to summing circuit 28. In the prior art system of FIG. 1 an output from multiplier 20 was coupled directly to summing circuit 28; however, this signal is now replaced by the output signal from the flyover homing circuit 40. Similarly, the contact warhead 33 (FIG. 1) has been replaced by a top attack warhead 38 and the optical sensor 39 shown in dashed lines in FIG. 3. The other circuit components of FIG. 3 are similar or identical to those of FIG. 1, have identical reference numbers, and are not discussed in detail except for operation/interaction with the flyover homing modifications as shown in the dashed lines.

Fly over homing circuit 40 includes a bias computation circuit 42, a range-to-go estimator 44, and a summing circuit 48. The distance from the target to the desired LOS passing through window 36 may be defined as an "over flight distance" or desired miss distance and may be chosen for optimum warhead performance or for any similar requirement that may be desired. This over flight or miss distance "D" is manually set into the bias computation circuit 42 before missile launch. The autotracker may be a plurality of individual trackers simultaneously tracking designated points on the target or a single tracker selectively switching between the designated points. Both systems are established in the art, and both will provide the function. The designated points may be defined as individual windows or correlators selected on the target and/or background. These points are referred to hereinbelow as correlators 52. The rate of displacement of the correlators 52 (FIG. 5), which is due to missile closure toward the target, relative to their individual location in the optical field of view provides electrical signals representing the instantaneous optical flow. Electrical signals are output from the autotracker to the range-to-go estimator 44 of the fly over homing circuitry. These signals represent the displacement of the individual tracker correlators placed throughout the target and background, and are used to maintain target track. Central focal point or centroid 53 on the target is the track center for these correlators, which allows the missile to fly substantially in a line over the target, over the centroid. The estimated range-to-go output is determined from the optical flow field within this electrical signal from the seeker. The details of the range-to-go estimator circuitry is set forth hereinbelow. An electrical signal representing the missile velocity $V_m$ is provided by the autopilot 22 to the bias computation circuitry 42. The bias circuitry produces the bias as follows.

$$B = \frac{V_m D}{R^2} \quad (1)$$

and wherein

B=bias in radians/second,
$V_m$=missile velocity in meters/second,
R=range-to-target in meters, and
D=desired over flight distance in meters.

The summing circuit 48 adds the bias B to the "x" axis rate command to produce the new rate command. Summing circuit 28 now receives the new output rate command and also receives a feedback signal from rate gyro 24 to provide an output that is coupled to the gain and compensation circuitry 30. The output from gain and compensation circuitry 30 is coupled to the gimbal and torque motor 26 according to established practices and maintains the desired missile controls for flight toward the desired target zone. The effect of bias B on missile 11 is to guide the missile over the top of the target by the distance D, as opposed to prior art practice which would guide the missile to a direct impact. The new warhead implementation (top attack warhead 38) and the warhead firing circuitry (optical sensor 39) are shown in dashed lines. When the missile passes over the top of the target, the optical sensor 39 detects the contour of the target and sends an electrical signal to the warhead 38 to fire as the warhead passes over the desired hit point.

This allows the use of stand-off/vertical top attack warheads such as an explosively formed penetrator to be delivered to the target effectively. The warhead firing is controlled by the optical sensor and the predicted range-to-go estimate. The system uses passive ranging techniques and range estimation calculations. An alternative implementation is to have an onboard active ranging device such as a laser range finder, boresighted with the imaging seeker, and which can be on the same gimbal with the imaging seeker.

RANGE-TO-GO ESTIMATE

The range-to-target, R, is based on the initial range estimate and may be updated during missile flight. Before in flight updates are passed to the guidance, the following equation is used to calculate the range to go estimate:

$$R = R_i - V_{est} t \quad (2)$$

wherein $R_i$=initial range, $V_{est}$=estimated velocity, and $t$=time in seconds from launch.

Figure 4:
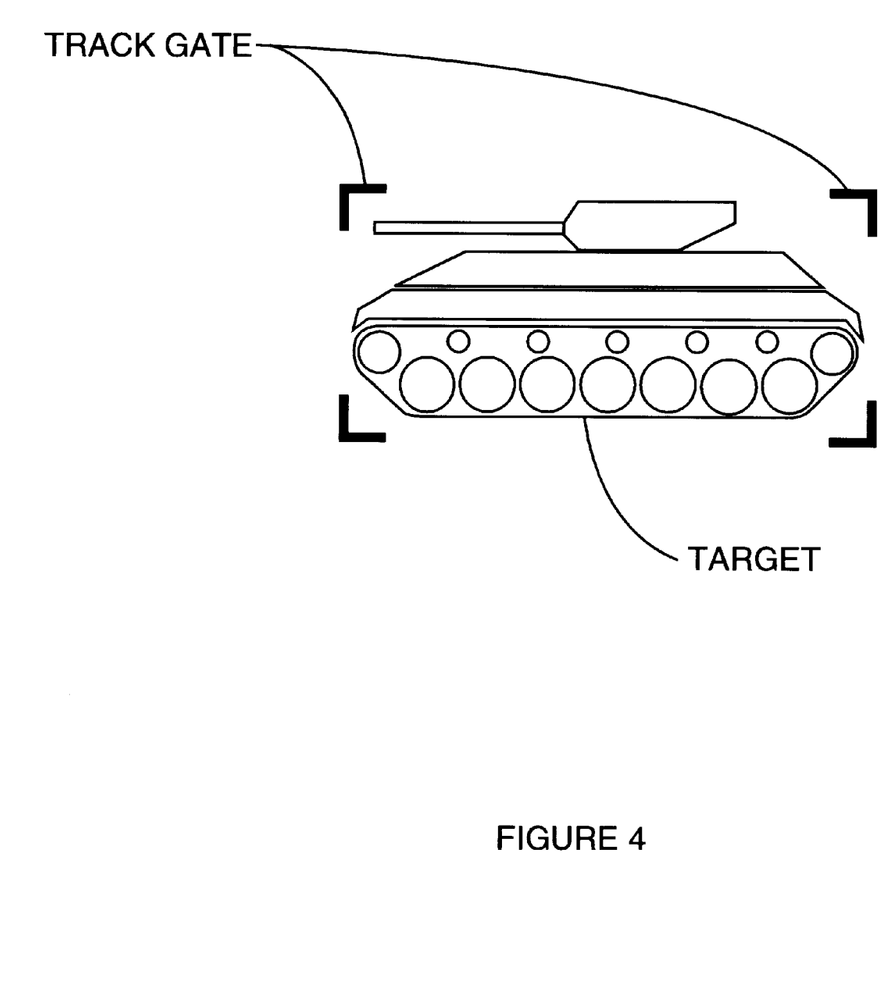
FIG. 4 shows a typical target image tracked by the autotracker, the image lying within the track gates.

FIG. 4 shows a typical target image wherein the target lies within the autotracker track gates. The target tracking gates are sized and positioned by the gunner to approximate the size and position of the target prior to initiating track. This is represented visually to the gunner by placing a box or corner markers around the target in the imagery, which is a standard practice used in imaging tracking systems. Before launch, if accurate range information is known and provided from an external source such as a laser range finder (not shown) at the launcher 34 and the target movement during the missile flight is negligible, then the bias as initially implemented may be sufficient. However, it is assumed that this range estimate may not be accurate enough, will not be available, or the target can move sufficiently to be outside the initially provided range. Therefore, a passive ranging algorithm has been developed and implemented in the system to calculate the range to target during missile flight. The initial range estimate is derived from the target size based on the track gate size or from a laser rangefinder or similar device, which may be selected automatically by the autotracker 16 or may be manually set or an estimated size selected by the gunner. The initial gate size is used in equation (1) from missile launch until the flow field equation (2) produces a valid range update. At this time the new range is filtered in from the old range using an alpha filter according to equation (3) as set forth hereinbelow. The alpha filter is used to prevent large transient commands which may otherwise occur immediately following a range update. A linear ramp function was chosen although many similar filters could also serve the purpose.

$$R_{new} = (1-b(t))x_{old} + b(t)x_{new} \quad (3)$$

where:

$R_{new}$=range derived using filtered output, $x_{old}$=range estimate before update, $x_{new}$=range estimate after update, and $b(t)$=a function of time.

The function b(t) is a function of time that begins at 0 for time before the update and begins a linear ramp up to 1 in the time interval tR seconds, which is chosen to minimize the transient effects of the update, because the range update may come very late in the flight, just seconds before target intercept. Typically, tR may be in the range between 0.1 and 1 second. After time interval tR the filtered output is replace by the new range estimate. Several methods have been evaluated and considered to calculate the in flight range to go, including the growth of the track gate size as the missile closes on the target, and off line-of-sight trajectory perturbations to allow the rate sensor, and seeker responses to be used in the calculation. While these other methods have proven to work, the fly over homing guidance system uses the Optical Flow Field Range Estimation. This method is chosen because of the reliability, applicability for short range targets, and the fact that many of the necessary tools and calculations needed to implement the optical flow field method were already implemented in the terminal homing autotracker, which was used in the development of this guidance method.

Figure 5:
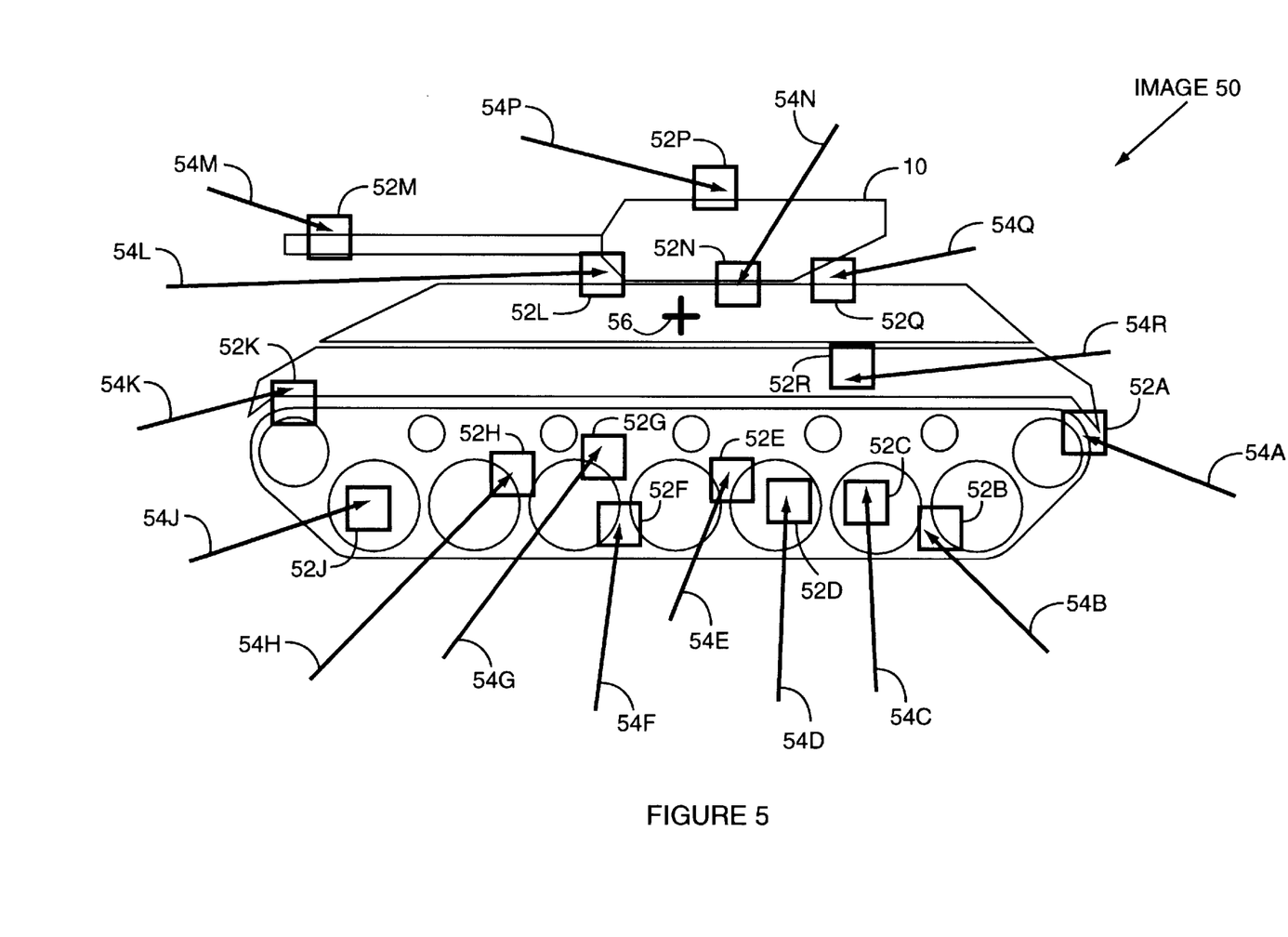
FIG. 5 is a typical target showing a plurality of tracking points wherein selected correlator points or zones on a target are tracked using the optical flow field range estimation method of tracking.
Figure 6:
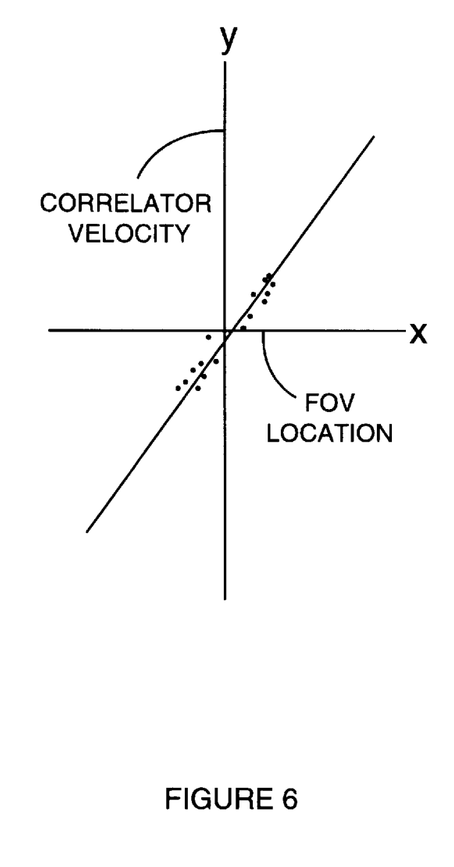
FIGS. 6, 7, and 8 are respective graphs of the individual correlation velocities (y axis) and the field-of-view location of the respective correlators (x axis) at a given instant in time as the missile flies toward the target zone.

FIG. 5 demonstrates the Optical Flow Field Range Estimation Method. In the two dimensional image 50 that is generated by the imaging seeker 14, up to sixteen individual correlators 52 are placed on the target 10 and on the background around the target. Each of these correlators track the small portion of the target or background directly underneath it from one image frame to the next. The displacement in the image of each correlator from the previous image occurs from frame to frame and is used to generate a velocity vector 54 between the missile autotracker and the respective correlation points. The velocity vector for each correlator on the target is different from adjacent velocity vectors. For a stabilized closed loop seeker in a terminal homing missile, where the missile is getting closer to the target with every frame of video, these velocity vectors will move outward from the aimpoint 56 or focal point of the field-of-view location as the missile closes on the target. The velocity vector of each correlator (y axis) is shown in FIG. 6 with respect to its location in the seeker FOV (x axis). The slope of the line is generated by the correlation locations verses correlation velocities for each correlator. The slope of the line changes with respect to the range to go to the target. Thus, as the missile reaches close proximity to the target window, the individual target velocities (vectors) are no longer necessary to assure the passage of the missile through the target window over the target, and inherently assures a substantially vertical impact of a warhead on the target.

Correlation tracking is accomplished by comparing a stored reference image to the new incoming seeker image. Mean Absolute Difference (MAD) correlation tracking is well established in the art and may be reviewed in standard references such as "The Infrared Handbook" by William L. Wolfe and George J. Zissis, published in 1978. Multiple correlation tracking is the process of tracking more than one track point or object at a time in the same incoming seeker imagery. To accomplish this, one correlator may be implemented in the circuitry for each desired track point. An alternate approach would be to implement a lesser number of correlation circuits than desired track points and simply store different references for each track point, requiring the correlation circuitry to be executed one time for each track point for every frame of imagery tracked. The exact implementation is dictated by hardware size requirements, required track rates, cost, etc.

As an example of the warhead firing logic, refer to FIG. 2. The image tracked by the autotracker is shown in FIG. 4. The tracked object is the object within the track gates. For the fly over homing guidance system, the missile is flown over the top of the target as shown in FIG. 2. The guidance system predicts a window of time for the missile to fly over based on estimated range to go. This window of time is used to fuse the warhead and to allow warhead firing based on the optical sensor. The optical sensor detects the leading edge of the tank, the leading edge of the turret, the trailing edge of the turret, and the trailing edge of the tank or a subset of these. The exact timing of the warhead firing will depend on the target of interest and the angle of the optical sensor versus the target, (if it is forward looking or orthogonal to the target).

Figure 7:
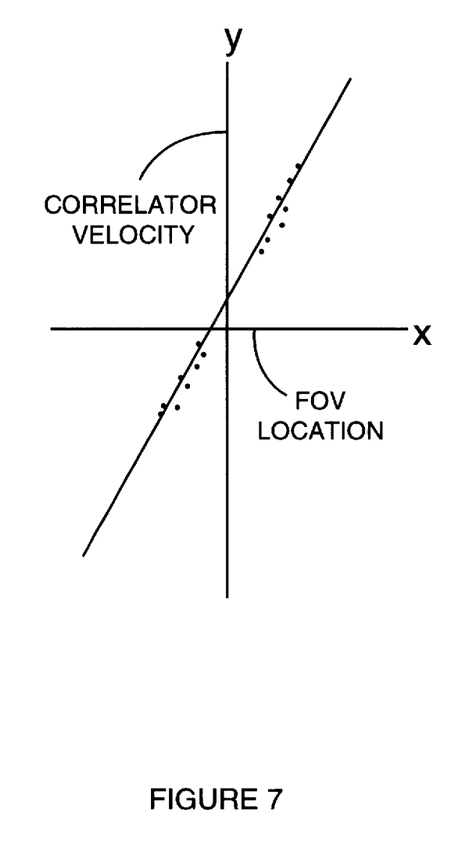
Figure 8:
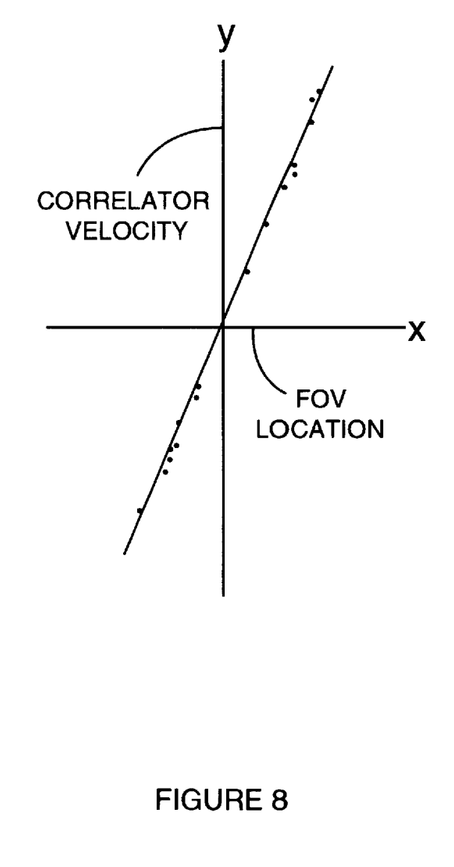

The optical sensor is used to determine the warhead detonation point. The sensor may be a near-infrared laser ranging profilometer, which repetitively measures laser pulse time-of-flight to calculate distance from the missile down to the ground or to the target surface. If signal filtering is desired, a set of target matching algorithms may be used to discriminate targets from clutter and select the optimal hit point based on this target profile shape. Similarly, a magnetic sensor, such as a magnetometer may be used to detect deviations in the total field caused by the presence of a large ferro-magnetic object. Deviations above a preset threshold are required to enable warhead detonation. The magnetic signature may thus be used as target confirmation, not in the hit point determination. FIGS. 6, 7, and 8 show respective graphs of the individual correlation velocities (y axis) and the field-of-view location of the respective correlators (x axis) at a given instant in time as the missile flies toward the target zone. Each Figure shows all sixteen of the correlator points on the graph. FIG. 6 is taken with the missile farthest away from the target; FIG. 8 is taken with the missile closest to the target. The slope of the line changes as the missile approaches the target. The position of each correlator changes along the line as the missile approaches the target because of the increased proximity of the autotracker (and missile) to the target.

Although a particular embodiment and form of this invention has been described, it will be apparent to those skilled in the art that various modifications and embodiments of the invention may be made without departing from the scope and spirit of the invention. For example, a magnetometer may also be used in conjunction with the optical sensor, if desired, but is not required. Similarly, a crush switch may also be included in the warhead firing logic. The crush switch would be used to fire the warhead upon impact with the turret or some other object, after detection of the leading edge of the target. Accordingly, the scope of the invention should be limited only by the claims appended hereto.

We claim:

1. A fly over homing guidance system for terminal homing guidance of a missile toward a predetermined target and comprising: target sensing means for tracking a target, a target window adjacent to said target, said target window adjacent to the target is a window over the top of the target, said window lying in a plane passing through the target and being substantially normal to the look axis of the missile, guidance means for directing a missile toward said target window and for intentionally avoiding direct impact of the missile with the target, said target sensing means having an output coupled to said guidance means for coupling target ranging information to said guidance means, stand off warhead means on said missile, and activating means coupled to said stand off warhead means for firing the warhead means from the missile toward the target.

2. A fly over homing guidance system as set forth in claim 1 and wherein said target sensing means is an imaging sensor on a stable platform.

* * * * *